United States Patent
Horn et al.

(10) Patent No.: US 10,999,882 B2
(45) Date of Patent: May 4, 2021

(54) MULTIPATH CONTROL OF DATA STREAMS

(71) Applicant: Telefonaktiebolaget LM Ericsson (publ), Stockholm (SE)

(72) Inventors: Uwe Horn, Aachen (DE); Branko Djordjevic, Herzogenrath (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 106 days.

(21) Appl. No.: 15/508,767

(22) PCT Filed: Sep. 5, 2014

(86) PCT No.: PCT/EP2014/068911
§ 371 (c)(1),
(2) Date: Mar. 3, 2017

(87) PCT Pub. No.: WO2016/034245
PCT Pub. Date: Mar. 10, 2016

(65) Prior Publication Data
US 2018/0242383 A1    Aug. 23, 2018

(51) Int. Cl.
*H04W 76/15* (2018.01)
*H04L 12/707* (2013.01)
(Continued)

(52) U.S. Cl.
CPC ............. *H04W 76/15* (2018.02); *H04L 45/24* (2013.01); *H04L 47/11* (2013.01); *H04L 69/14* (2013.01); *H04W 28/24* (2013.01); *H04W 88/182* (2013.01)

(58) Field of Classification Search
CPC ...... H04W 76/15; H04W 28/24; H04L 45/24; H04L 47/11; H04L 69/14
See application file for complete search history.

(56) References Cited

U.S. PATENT DOCUMENTS

2005/0163093 A1    7/2005  Garg et al.
2011/0044218 A1*   2/2011  Kaur ..................... H04W 76/16
                                                       370/310
(Continued)

FOREIGN PATENT DOCUMENTS

| EP | 2574096 A1 | 3/2013 |
| WO | 2012099762 A1 | 7/2012 |
| WO | 2013061115 A1 | 5/2013 |

OTHER PUBLICATIONS

61912733,Specification,Dec. 6, 2013 (Year: 2013).*
(Continued)

*Primary Examiner* — Un C Cho
*Assistant Examiner* — Yu-Wen Chang
(74) *Attorney, Agent, or Firm* — Patent Portfolio Builders, PLLC (57) ABSTRACT

A method, by a multipath control entity, to control a transmission of a user data plane stream between a mobile entity and a proxy, wherein the user data plane stream is exchanged between the mobile entity and an application server connected to the proxy. In a split decision, it is determined that the user data plane stream is split into at least two stream parts and over which of the supported network technologies each of the at least two stream parts is transmitted between the mobile entity and proxy. A multipath connection module in the mobile entity is informed in a first control message which stream part is transmitted by which network technology in accordance with the split decision, and a multipath connection module provided in the proxy is informed in a second control message which stream part is transmitted by which network technology in accordance with the split decision.

4 Claims, 4 Drawing Sheets

(51) Int. Cl.
*H04L 12/801* (2013.01)
*H04L 29/06* (2006.01)
*H04W 28/24* (2009.01)
*H04W 88/18* (2009.01)

(56) References Cited

U.S. PATENT DOCUMENTS

| | | | | |
|---|---|---|---|---|
| 2012/0188949 A1* | 7/2012 | Salkintzis | ............. | H04L 45/308 370/329 |
| 2013/0083678 A1* | 4/2013 | Yin | ............. | H04L 43/08 370/252 |
| 2013/0195106 A1* | 8/2013 | Calmon | ............. | H04B 7/15521 370/389 |
| 2014/0045491 A1* | 2/2014 | Van Phan | ............. | H04W 88/04 455/426.1 |
| 2015/0043336 A1* | 2/2015 | Zhu | ............. | H04W 28/0268 370/230 |
| 2015/0043486 A1* | 2/2015 | Ozturk | ............. | H04W 88/06 370/329 |
| 2015/0085650 A1* | 3/2015 | Cui | ............. | H04W 28/08 370/230 |
| 2015/0124623 A1* | 5/2015 | Li | ............. | H04W 28/0284 370/236 |
| 2015/0215840 A1* | 7/2015 | Yiu | ............. | H04W 36/0069 370/329 |
| 2016/0128004 A1* | 5/2016 | Lee | ............. | H04W 52/146 370/311 |
| 2016/0366049 A1* | 12/2016 | Achouri | ............. | H04L 45/24 |
| 2017/0111825 A1* | 4/2017 | Babaei | ............. | H04N 21/236 |

OTHER PUBLICATIONS

Unknown, Author, "1000x: Higher efficiency", Qualcomm Incorporated, Nov. 2013, 1-33.
Office Action issued in EP application No. 14761345.9 dated Jul. 12, 2019 04 pages.

* cited by examiner

MULTIPATH CONTROL OF DATA STREAMS

CROSS-REFERENCE TO RELATED APPLICATION

This application is a U.S. National Stage Filing under 35 U.S.C. § 371 of International Application No. PCT/EP2014/068911, filed on Sep. 5, 2014, the disclosure of which is fully incorporated herein by reference.

TECHNICAL FIELD

The present invention relates to a method to control a transmission of a user data plane stream via different network technologies between a mobile entity and a proxy, the user data plane stream being exchanged between the mobile entity and an application server connected to the proxy. The invention furthermore relates to the corresponding multipath control entity, the mobile entity, the proxy and to a computer program and a computer program product.

BACKGROUND

Fixed and mobile applications are getting more and more bandwidth hungry. At the same time, the number of users of those applications is increasing. This leads to a dramatic overall increase in the amount of traffic which needs to be delivered between end-devices and internet servers or application servers.

Existing access technologies however reach their limits. For mobile access the problem could be solved by increasing the amount of spectrum allocated to wireless access technologies. However, finding additional spectrum becomes more and more difficult and usually takes several years to complete. Furthermore, the amount of spectrum which can be used in an economical way is fairly limited. Similar applies to fixed access technologies. It becomes more and more difficult to further increase the data rates which can be sent over existing copper lines (i.e. DSL, Digital Subscriber Line).

"Channel Bonding" has been identified as one way out of the current dilemma. Channel bonding includes all kind of methods which combine different channels (e.g. data transmission techniques) for creating a new logical channel which provides a bandwidth which is the sum of the bandwidths of each channel in the bundle.

Normally, "Channel Bonding" is applied to channels using the same physical access and data transmission technology. By way of example, bonding of several Ethernet connections, bonding of several DSL lines, bonding of several LTE carriers (multi-carrier aggregation) etc.

"Channel bonding" can happen on different OSI protocol layers. For instance, multi-layer PPP (Point to Point Protocol) is a technique to aggregate channels on OSI layer 2, MPTCP (Multipath Transfer Control Protocol) is a technique to aggregate channels on OSI layer 4. There are pros and cons of the different approaches. Which of the available techniques is best and how to utilize them cannot be decided a priori. It rather depends very much on the service running on top, the available access technologies, and other factors.

Accordingly, a need exists to further improve the traffic handling between end devices and application servers with the use of an approach which is transparent to existing application and application servers, so that there should be no change required to the application servers or client apps.

SUMMARY

This need is met by the features of the independent claims. Further embodiments are described in the dependent claims.

According to a first aspect, a method is provided by a multipath control entity to control a transmission of a user data plane stream via different network technologies between a mobile entity and a proxy with the user data plane stream being exchanged between the mobile entity and an application server connected to the proxy. The method comprises the step of determining which network technologies are supported by the mobile entity. Furthermore, it is determined which network technologies are available for the mobile entity. In a split decision, it is determined to split the user data plane stream into at least two stream parts and over which of the supported network technologies each of the at least two stream parts is transmitted between the mobile entity and the proxy taking into account the supported and available network technologies. Furthermore, a multipath connection module in the mobile entity is informed in a first control message which stream part is transmitted by which network technology in accordance with the split decision. Additionally, a multipath connection module provided in the proxy is informed in a second control message which stream part is transmitted by which network technology in accordance with the split decision.

Based on capabilities of the end device, the mobile entity and based on the available access technologies, the multipath control entity can set up appropriate data channels for uplink traffic from the mobile entity to the application server and for downlink traffic from the application server to the mobile entity. By splitting a user data plane stream into at least two stream parts, the traffic between the end device and the application server can be further optimized and a greater flexibility is obtained how data is exchanged between an application on a mobile entity and an application server. By using a proxy connected to the application server, the application server does not have to support the multipath transmission technology.

The network technologies included in the split decision may comprise at least one wired network technology using a wired connection between the mobile entity and the proxy and at least one wireless network technology using an at least partly wireless connection between the mobile entity and the proxy. One stream part may be transmitted via at least one wired network technology wherein another stream part may be transmitted over the at least one wireless network technology.

In this example, wireless transmissions are combined with wired data transmissions. If a wired connection is included, the mobile device, be it a telephone, a PDA, a notebook or netbook, has a wired connection to the internet or network to which the application server is connected.

Furthermore, it is possible that different network technologies are different radio access network technologies of at least one mobile communications network. In the split decision, it is then determined over which radio access network technology a stream part is transmitted.

In this example different cellular transmission network technologies, e.g. UMTS or LTE or Wi-Fi, are combined. The different network technologies may be provided by a single network provider or several different network providers. The split decision could indicate that the same or different radio access network technologies provided by different cellular network providers are used. Furthermore, the different radio access network technologies may be provided by a single network provider.

The multipath control entity may furthermore determine subscriber rated information so that the split decision is made taking into account the determined subscriber rated information. With the use of subscriber rated information, a network operator can influence which mobile entity is provided with which transmission technology. The operator may use rules defined by the operator to determine in the split decision how the user data plane stream is split into at least two stream parts.

The invention furthermore relates to the corresponding multipath control entity comprising a policy module configured to determine the available and supported network technologies, the policy module making the split decision. A multipath managing module of the multipath control entity can then a multipath connection module and the mobile entity and the proxy in a corresponding control message which stream part is transmitted by which network technology in accordance with the split decision.

The invention furthermore relates to a mobile entity configured to exchange a user data plane stream with a proxy using at least two different network transmission technologies with the user data plane stream being exchanged between the mobile entity and an application server connected to the proxy. The mobile entity comprises at least one application requesting an exchange of the user data plane stream with the application server. A multipath connection module is configured to receive a data control message from the multipath control entity and is configured to determine from the control message that the user data plane stream is split into at least two stream parts and over which of the supported network technologies each of the at least two stream parts is exchanged with the proxy. A multiplexing/demultiplexing module is configured to exchange the user data plane stream with at least two stream parts in accordance with the control message to prepare at least two stream parts for transmission to the proxy using the network technology mentioned in the control message and to prepare the reception of at least one stream part from the proxy using the network technology mentioned in the control message. The invention furthermore relates to the corresponding method for operating the mobile entity wherein the control message is received from the multipath control entity how the user data plane stream is split into at least two stream parts and it is then determined how the user data plane stream is exchanged with at least two stream parts. The user data plane stream is further splitted into at least one stream part in accordance with the control message and the at least one stream part is transmitted to the proxy using the corresponding network technology mentioned in the control message. Furthermore, the reception of at least one stream part using the network technology mentioned in the control message is prepared.

Furthermore, the invention relates to the proxy configured to exchange the user data plane stream with the mobile entity using at least two different network transmission technologies wherein the user data plane stream is exchanged between the mobile entity and the application server connected to the proxy. The proxy comprises a multipath connection module configured to received the control message from the multipath control entity and configured to determine from the control message that the user data plane stream is split into at least two different stream parts and over which of the supported network technologies each of the at least two stream parts is exchanged with the mobile entity. A multiplexing/demultiplexing module is provided configured to exchange the user data plane stream with the at least two stream parts in accordance with the control message and to transmit at least one stream part for transmission to the mobile entity using the network technology mentioned in the control message. Furthermore, the reception of at least one stream part using the network technology mentioned in the control message is prepared. The invention furthermore relates to the corresponding method for operating the proxy.

The invention furthermore provides a computer program comprising a program code to be executed by at least one processing module of the multipath control entity, the mobile entity, or the proxy, wherein execution of the program causes the multipath control entity, the mobile entity, and/or the proxy to perform the steps mentioned above. Furthermore, a computer program product comprising the program code to be executed by the at least one processing module of the multipath control entity, the mobile entity, or the proxy is provided, wherein the execution of the program code causes the multipath control entity, the mobile entity, or the proxy to perform the steps mentioned above, or described in more detail further below.

BRIEF DESCRIPTION OF THE DRAWINGS

The invention will now be described in further detail by example and with reference to the enclosed figures.

In the figures.

DETAILED DESCRIPTION OF EMBODIMENTS

The present invention describes an approach which allows network operators to manage channel bonding with a rule-based approach which provides a greater flexibility and allows an operator to integrate existing and upcoming channel bonding techniques.

During session setup, a multipath control entity fetches information from various network elements and databases. This information provides the multipath control entity with knowledge about the capabilities of the end device/mobile entity and the available access technologies, the type of service a user wants to use etc. Based on this information which inter alia defines a session context and based on rules which are predefined by an operator of a mobile communications network in which the multipath control entity is provided, the multipath control entity can instruct multipath connection modules in the mobile entity and the network proxy to set up appropriate data channels for uplink and downlink traffic. Each of the data channels transmitting one of the stream parts of the user data plane stream can be realized by different access technologies. The specific characteristics, e.g. which access technologies are to be used and how the data stream should be spread across the different access technologies or subchannels are defined via the above-mentioned operator specific rules. A multiplexing/demultiplexing module in both the mobile entity and the proxy takes care of multiplexing and demultiplexing the data stream to and from the available channels. This multiplexing/demultiplexing module provides a standard network interface to both the mobile entity and the application server. In this way, the multipath transmission is transparent for both applications running on the mobile entity and application servers provided e.g. in the internet.

Figure 1:
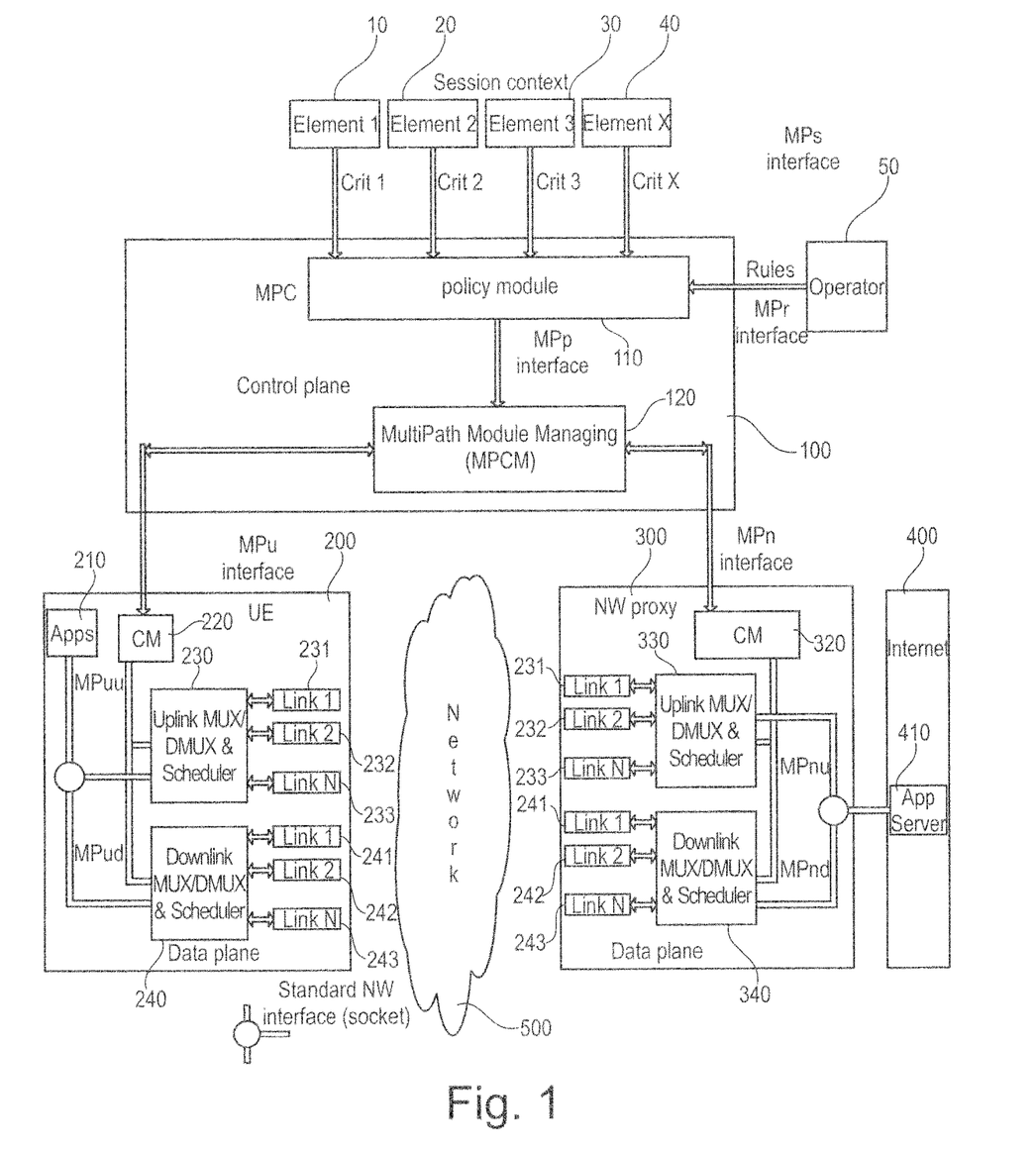
FIG. 1 shows architectural overview of the entities involved in the transmission of a user data plane stream using at least two different stream parts and different transmission technologies to exchange the data between a mobile entity and an application server.

FIG. 1 provides an architectural overview over the components involved in a system and method where the transmission of a user data plane stream is split into several stream parts transmitted over different network technologies. In the embodiment shown in FIG. 1, a mobile entity or user entity, UE 200, on which an application 210 is running is exchanging data with an application server 410 which in the embodiment shown is located in the internet via a network 500. It should be understood that the application server 410 may be located in any other local or wide area network via which it is accessible to the mobile entity 200. The data, especially the user data plane stream of a session is exchanged between the mobile entity 200 and the application server 410. As can be seen from FIG. 1, the mobile entity 200 is capable of transmitting and receiving user data using different network technologies. This is symbolized for the uplink direction by multiplexing/demultiplexing unit 230 where different links 231 to 233 are shown, each link indicating a different transmission technology, e.g. a wired connection, a wireless connection using UMTS, a wireless connection using LTE, a wireless connection using Wi-Fi etc. In the same way for the downlink direction, a multiplexing/demultiplexing module 240 is provided providing different links 241-243 symbolizing the different transmission technologies. The data are transmitted via the network 500 to a proxy 300. This proxy 300 is also capable of transmitting data to the mobile entity 200 using different wired or wireless network technologies as symbolized for the uplink direction by multiplexer/demultiplexer 330 including the different links 231-233 and for the downlink direction by the multiplexer/demultiplexer 340 including the different links 241-243.

As can be also deduced from FIG. 1, the application server 410 is not necessarily able to provide a data transmission using different transmission technologies. Nevertheless it is also conceivable that the functionality of the above proxy is combined with or included in the application server itself, for example if the application server is part of an access network of a communication network.

A multipath control entity 100 controls which transmission technology is used for the data transfer between the mobile entity 200 and the network property 300. The multipath control entity 100 comprises a policy module 110 which determines in a split decision that the user data plane stream is split into at least two stream parts based on input received from different information sources such as information sources 10 to 50 shown in FIG. 1. The information source 10 may provide information related to the mobile entity 200 or the applications that are running on the mobile entity together with a Quality of Service, QoS, required by the application. By way of example, an application monitoring the running applications on the mobile entity may send data each time when one application is opened or closed on the mobile entity. Information source 10 can inter alia provide information about which network technologies are supported by the mobile entity. Information source 20 may provide information which network technologies are available for the mobile entity at the present location of the mobile entity. This location information and the network technologies available at the corresponding location may be provided by a network node such as E-SMLC (Evolved Serving Mobile Location Centre).

Another information source such as source 30 may be a subscriber database e.g. provided by a BSS (Business Support System). Another information point may be source 40 which may be the OSS (Operation Support Systems) or an eNodeB and may provide information such as the cell load of the different network technologies. Furthermore, an operator source 50 may be provided via which the operator can define rules used by the policy module 110. The policy module 110 receives the input from the different elements 10-50 and then makes a decision to split the user data plane stream into the at least two stream parts and how the user data plane stream is divided into at least two stream parts. This decision is then forwarded to a multipath managing module 120 in the multipath control entity which takes care of establishing corresponding data channels for both uplink and downlink.

In a mobile communications network, the multipath control entity 100 can be a standalone element or it may be integrated into existing policy control charging modules, such as the PCRF (Policy Control Rules Function) on the control plane and the PCEF (Policy Control Enforcement Function) on the data plane. The multipath control entity can be provided by one service provider and can be part of a cellular network, e.g. if the cellular and Wi-Fi is provided by the same service provider. Entity 100 could also be provided outside a cellular network.

Examples for data plane embodiments are MLPPP (Multilink Point to Point Protocol) or MPTCP (Multipath Transmission Control Protocol) or carrier aggregation.

The information sources 10 to 40 provide session-related context which contains criteria generated by different network elements or databases of a telecommunications network in which the multipath control entity is provided. As discussed above, the capabilities of the mobile entity, the required quality of service, the available carriers and the congestion level will be used as a basis for the decision how the uplink and downlink data are split into stream parts. These session-related criteria are provided by MPs interfaces to the policy module 110. Operator rules are provided by source 50 via an nPr interface. The decision made by the policy module is forwarded to the multipath managing module 120 via an internal policy interface MPp.

The multipath managing module 120 then both instructs the mobile entity 200 and the network proxy 300 via a multipath connection module (CM) 220 in entity 200 and the multipath connection module 320 provided in the proxy. The decision is transmitted to the mobile entity and the proxy using control messages in which both entities are informed about the data channels/links to be used for the uplink, the data channels/links to be used for the downlink and how much traffic can be sent via each of the data channels. The control message sent to the mobile entity can be a first control message and the control message sent to the proxy 300 can be a second control message. In the split decision it can be decided that one stream part with one network technology is used for the uplink whereas for the downlink one stream part is used using a different transmission technology. Furthermore, it is possible that either for the uplink path or the downlink path or for the uplink and downlink path the user data are each split into at least two stream parts so that at least two stream parts are transmitted in the uplink and/or at least two stream parts are transmitted in the downlink wherein in each direction the transmission technologies for each of the at least two stream parts differ from one another.

By way of example, for the downlink stream transmission technology A may be used whereas for the uplink stream a different transmission technology B may be used. In another embodiment, two uplink stream parts with technologies A and B are used and a single downlink stream part with technology A. Other embodiments include two uplink stream parts with technology A and B, respectively and two downlink stream parts with technology C and D respectively, or two downlink stream parts with A and B respectively and one uplink stream part with technology A or C. These exemplary scenarios are not limiting. It is possible to employ more than two transmission technologies for the uplink stream; likewise, it is possible to employ more than two transmission technologies for the downlink stream. E.g., three, four or more transmission technologies may be employed for the uplink stream and/or the downlink stream.

The interface towards the mobile entity is an MPp interface while the interface towards the proxy is an MPn interface. The connection modules 220 and 320 execute the instructions received from the multipath managing module. The connection module 220 instructs both the uplink and downlink multiplexer/demultiplexer 230-240 in which also the scheduler is provided which is responsible to determine the chronological order of the different data packets of the user data plane stream when the data plane stream is divided into at least two stream parts so that the data packets can be brought into the correct chronological order at the receiving side. The multiplexer/demultiplexer scheduler distributes the data plane traffic via two or more links wherein each link can represent one of several access types such as DSL, 3G, LTE, Wi-Fi, or Satellite. The interfaces in the mobile entity between the connection module 220 and the multiplexer/demultiplexer are called MPuu and MPud. In the same way, the interfaces between the connection module 320 and the multiplexer/demultiplexer 330 and 340 are an MPnu and an MPnd interface. The interfaces in the mobile entity between the application 210 and the uplink multiplexer/demultiplexer 230 and the downlink multiplexer/demultiplexer 240 can be standard network interfaces. Furthermore, the interfaces between the application server 410 and the internet and the uplink multiplexer/demultiplexer 330 and downlink multiplexer/demultiplexer 340 in the proxy can be standard network interfaces.

Figure 2:
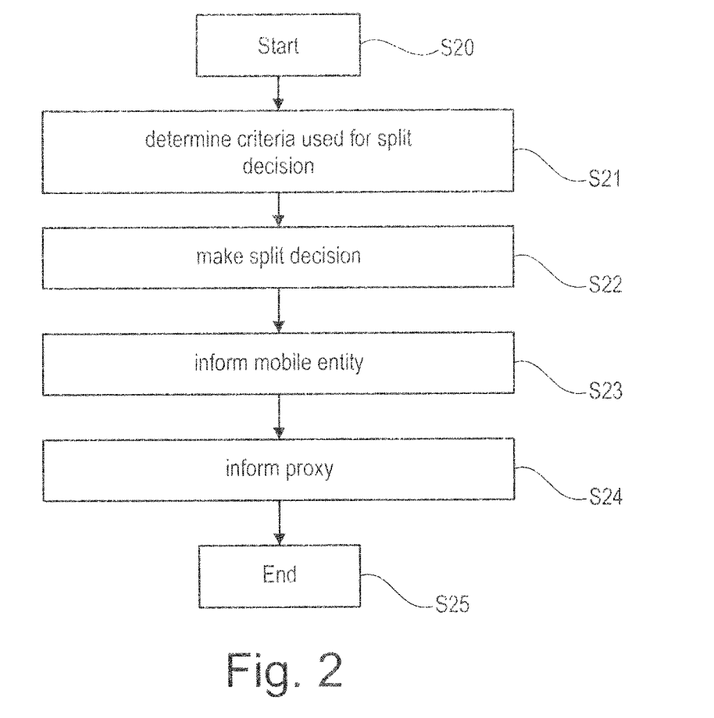
FIG. 2 shows a flowchart comprising the step carried out by a multipath control entity shown in FIG. 1 to support the transmission of a user data plane stream in different stream parts.

FIG. 2 summarizes the main steps carried out by the multipath control entity 100 when the user data are to be transmitted from the mobile entity to the application server or from the application server to the mobile entity. The method starts in step S20 and in step S21, the different criteria are determined which are used to come to the split decision by the policy module 110. As discussed above, operator-based rules and session-related input can be used to come to the decision. It should be understood that the information need not to be received necessarily from all of the four elements shown in FIG. 1 to determine the session-related criteria. Any of the criteria alone or in combination with other criteria may be used to come to the split decision. In step S22, the policy module then makes the split decision based in the input received from the different interfaces. In steps S23 and S24, the mobile entity and the network proxy 300 can then be informed about the decision how to split the user data plane stream in each direction in a first and second control message. As discussed above, the decision may be provided to multipath managing module which then generates a control message which allows the connection modules 220, 320 in the mobile entity 200 and the proxy 300 to instruct the multiplexing/demultiplexing modules accordingly to split the user data plane stream into two different stream parts as indicated in the control message. The method then ends in step S25.

Figure 3:
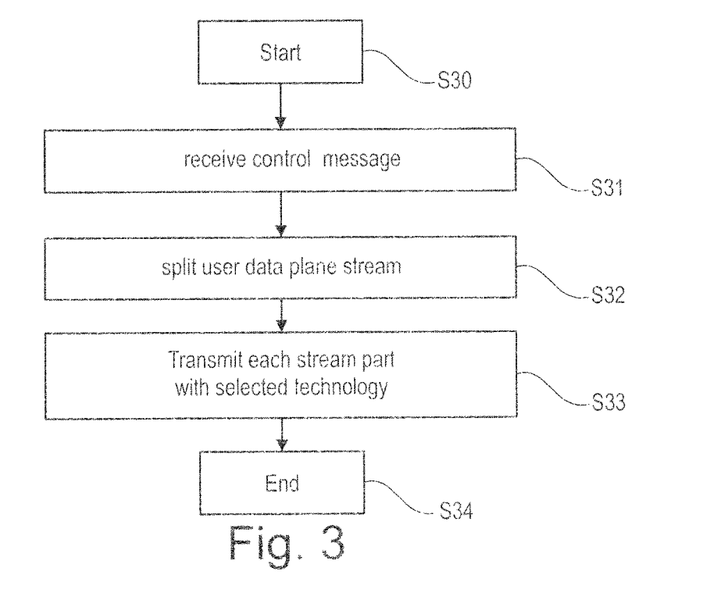
FIG. 3 shows a flowchart comprising the steps carried out by a mobile entity or a proxy to actually exchange the stream in different stream parts in accordance with instructions received from the multipath control entity.

In FIG. 3, the main steps carried out by either the mobile entity 200 or the network proxy 300 are summarized. The method starts in step S30 and in step S31, the control message as generated by the multipath managing module is received by the mobile entity 200 or by the proxy 300, i.e. by the connection modules 220 or 320 in the mobile entity and proxy respectively. The connection modules 220, 320 then execute the received control message and instruct the multiplexer/demultiplexer and scheduler to split the user data plane stream into at least one stream part for each direction (step S32). In step S33 each stream part is then transmitted by one of the multiplexing/demultiplexing modules using one of the links. The method ends in step S34.

Figure 4:
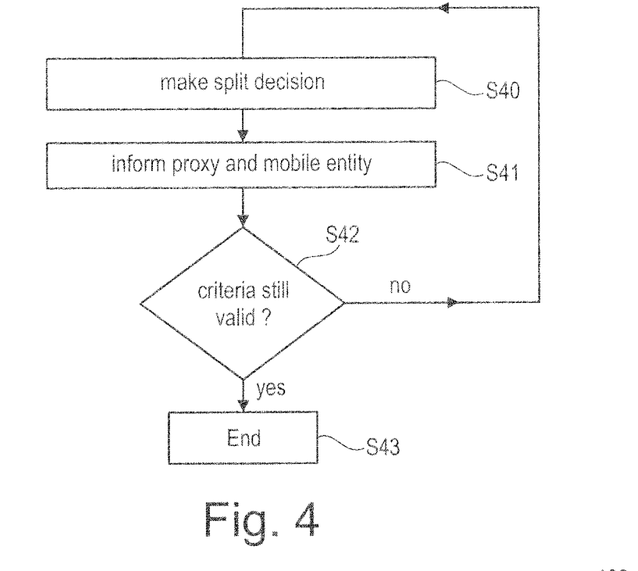
FIG. 4 shows a flowchart including the step carried out by the multipath control entity shown in FIG. 1 in which the criteria on which a split decision to generate at least two stream parts is based, is monitored.

In connection with FIG. 4, an embodiment is disclosed where the multipath control entity continuously monitors the input received from the different sources 10 to 50 to check whether the split decision is still in agreement with the current operator input or the current network conditions. In FIG. 4 in step S40, the split decision is made as discussed above in connection with FIG. 2, step S40 corresponding to step S22 of FIG. 2. The proxy 300 and the mobile entity 200 are informed in step S41 which corresponds to the steps S23 and S24. In step S 42, it is then asked whether the criteria which formed the basis for the split decision are still the same or whether they have changed. It may be especially asked in step S42 whether one of the criteria on which the split decision is based changes more then a predefined threshold. If this is the case, meaning that at least one of the criteria is not valid anymore, the method returns to step S40 where a new split decision is made how the user data plane stream is split into at least two new stream parts and over which network technology each stream part is transmitted. The multipath connection modules in the mobile entity and the proxy are then informed accordingly with a new control message which new stream part is transmitted by which network technology in accordance with the new split decision. If the criteria are still valid, meaning that the network conditions have not changed, the split decision remains the same and the method ends in step S43.

In the example as described above, messages were sent from the multipath control entity to either the mobile entity or the proxy. However, in another embodiment it is also possible that the mobile entity 200 and/or the proxy 300 provides information to the multipath control entity 100. By way of example, the mobile entity, here the connection module 220, or the proxy, here the connection module 320, may be able to determine if the exchange of the user data plane stream over at least two different network transmission technologies is currently not possible at the mobile entity or the proxy. The proxy 300 or the mobile entity 200 may be congested by any reason and the proxy 300 and the mobile entity 200 each may decide to temporarily suspend the multipath functionality. The connection module 220 or 320 can then generate a suspend message in which the multipath managing module is informed that the multipath technology is currently not available. When the multipath technology becomes available again at the proxy 300 or the mobile entity 200, a corresponding message may be sent to the multipath managing module informing the multipath control entity that the multipath technology is available again.

Figure 5:
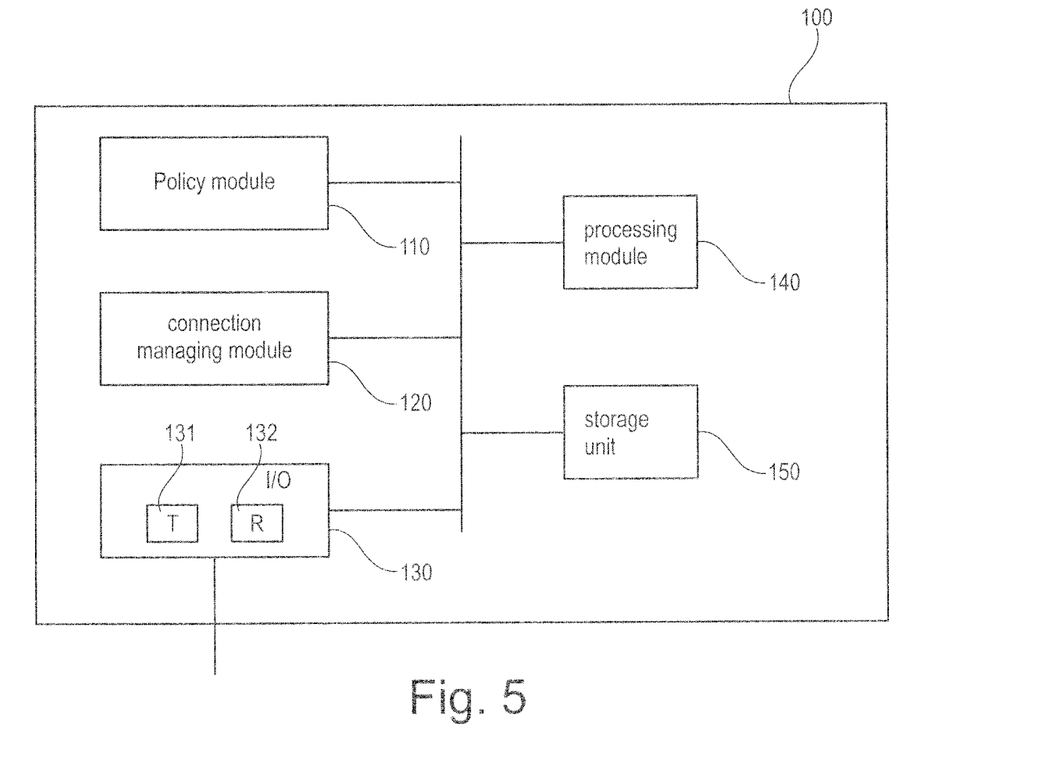
FIG. 5 shows a schematic view of multipath control entity configured to control a multipath transmission between the mobile entity and the proxy.

FIG. 5 illustrates an exemplary structural view of the multipath control entity 100. As already discussed above in connection with FIG. 1, the multipath control entity comprises a policy module 110 which, based on the received criteria, comes to a split decision that the user data are split into at least two stream parts, the policy module 110 further deciding how the user data are split into the different stream parts. The connection managing module 120 then generates the control message which is sent to the mobile entity 200 and the proxy 300. The different interfaces used by the multipath control entity were discussed above in connection with FIG. 1. In FIG. 5, the input/output unit 130 with a transmitter 131 and a receiver 132 symbolizes the possibility of the multipath control entity to communicate with the other entities such as the entities shown in FIG. 1 or any other network entity, the transmitter 131 providing the possibility to transmit inter alia control messages to other entities, the receiver 132 symbolizing the possibility to receive messages from other entities. A processing module 140 is provided comprising one or more processors which are responsible for the operation of the multipath control entity. The processing module 140 can generate the commands that are needed to carry out the above-discussed procedures in which the multipath control entity 100 is involved. A storage unit 150 which may be a memory such as a read-only memory, a flash memory, a random-access memory, a mass storage or the like, can include suitable program codes to be executed by the processing module 140 so as to implement the above-described functionalities of the multipath control entity.

Figure 6:
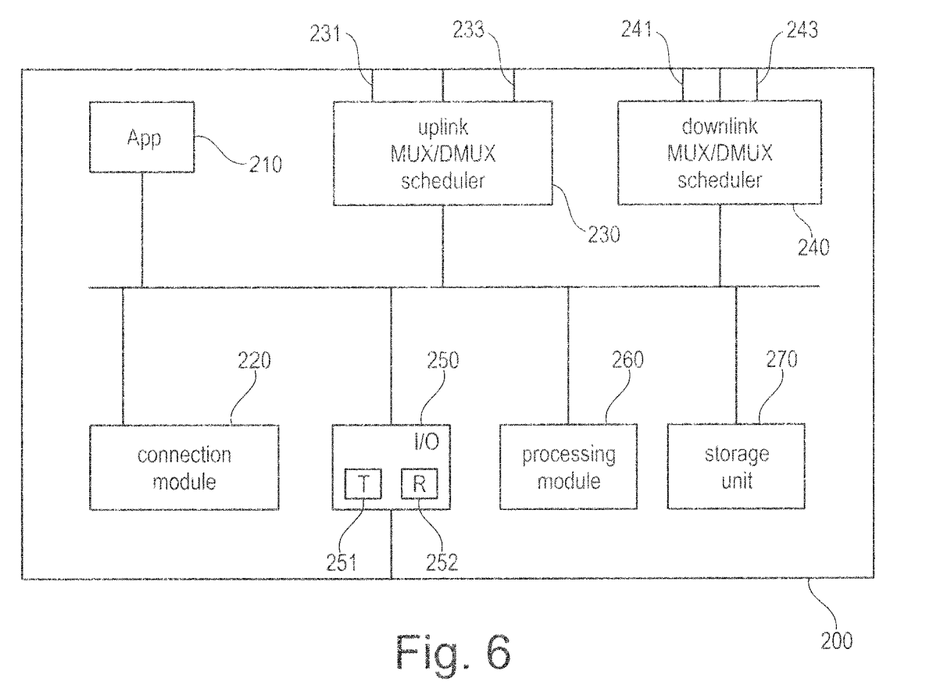
FIG. 6 is a schematic view of a mobile entity which exchanges different stream parts over different network technologies with a proxy.

FIG. 6 shows a schematic architecture of a mobile entity. The application 210, the multiplexer/demultiplexer 230 and 240 and the connection module 220 were already discussed in connection with FIG. 1 so that a detailed description of these modules is omitted. An input/output unit 250 is provided which symbolizes the possibility to communicate with the entities in addition to the data links 231-233 which are used for transmitting the stream parts. By way of example, the control message sent by the multipath control entity 100 may be received via a receiver 252, the transmitter 52 symbolizing the possibility to transmit messages such as the above-discussed suspend message to the multipath control entity 100.

The processing module 260 including one or more processors are responsible for the operation of the mobile entity, the storage unit 270 which may be any kind of memory including suitable program code to be executed by the processing module 260 to carry out the above-described functionalities of the mobile entity.

Figure 7:
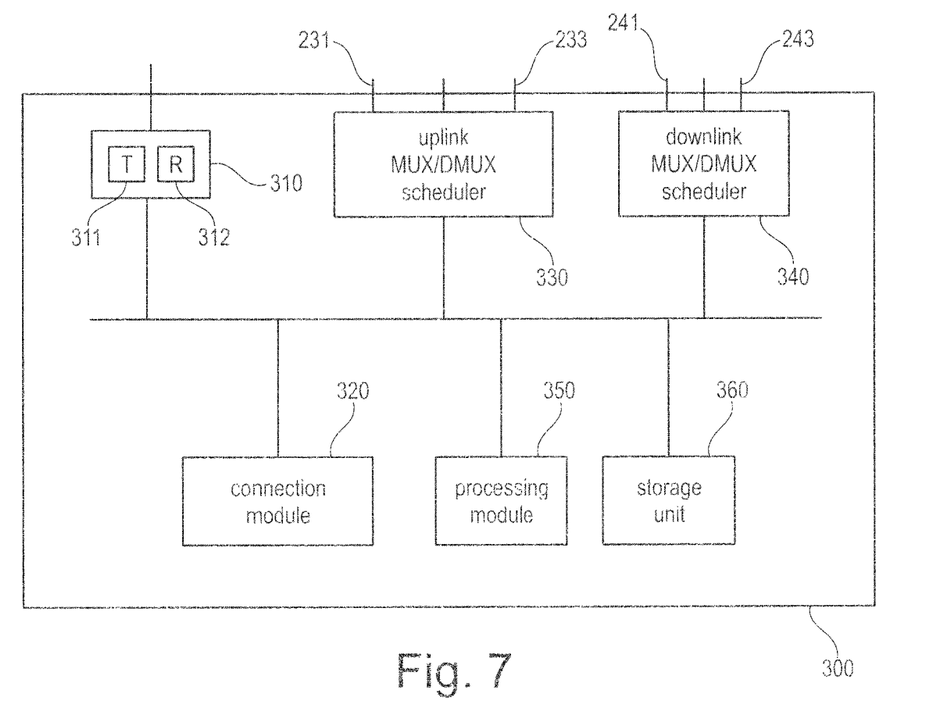
FIG. 7 is a schematic view of a proxy exchanging at least two stream parts using different network transmission technologies with the mobile entity of FIG. 6.

The architectural view of the proxy is shown in FIG. 7. The connection module 320 and the multiplexer/demultiplexer/scheduler 330 and 340 were discussed above in connection with FIG. 1. The input/output unit 310 providing the transmitter 311 and the receiver 312 indicate the possibility to transmit and receive messages from other entities in the network and the processing module 350 including one or more processors is responsible for the operation of the proxy 300. The storage unit 360 which may include any kind of memory includes suitable program codes to be executed by the processing module 350 so as to implement the above-described functionalities of the proxy.

It should be understood that the structures shown in FIGS. 5-7 are merely schematic and that each of the entities may include further components which for the sake of clarity have not been illustrated. By way of example, the mobile entity can additionally comprise input elements for user input such as a touch-sensitive surface and a display for displaying information.

It should be understood that the different functional modules shown in FIGS. 5-7 need not be incorporated by distinct entities. The functional modules may be incorporated into a single entity or the separation of the different entities may be different to the embodiment shown in the corresponding figure. Furthermore, the different functional modules shown in FIGS. 5-7 may be incorporated by hardware, software or a combination of hardware and software.

Some general aspects can be deduced from the description above. By way of example, the network technologies included in the split decision can comprise at least one wired network technology with a wired connection between the mobile entity and the proxy and at least one wireless network technology using an at least partly wireless connection between the mobile entity and the proxy and one stream part can be transmitted via a wired connection whereas another stream part is transmitted over a wireless network connection. The at least partly wireless connection means that not the whole path from the mobile entity to the proxy has to be a wireless connection. The wireless part can be limited to the radio access network part of a mobile communications network wherein a wired connection may be used from nodes such as an enodeB to the proxy.

In another embodiments, the different network technologies are different radio access network technologies provided by one or several telecommunications networks. The split decision then determines over which radio access network technology each stream part is transmitted. For the split decision it is possible to determine subscriber related information of the mobile entity so that the split decision is made taking into account the determined subscribe related information. Additionally, congestion information for the available network technologies may be taken into account so that the split decision is also made taking into account the determined congestion information. While it is determined that one of the radio access network technologies is heavily congested, the corresponding network transmission technology may not be used for the transmission of a stream part. Additionally, the position of the mobile entity may be determined so that the network technology is available for the mobile entity how to determine taking into account the determined position of the mobile entity, the position may be determined using satellite-based signals such as GPS, furthermore cell-based information present in the mobile communications network in which the mobile entity is present can be used to determine which network technology, especially which radio network access technology is available for the mobile entity.

Furthermore, it is possible that information is collected which at least one application is running on the mobile entity and which quality of service requirements each of the running applications has. The split decision then is made taking into account the running application and the corresponding quality of service requirement.

The split decision can be made for the uplink connection from the mobile entity to the proxy and for the downlink connection from the proxy to the mobile entity. The network technology selected for the stream part for the uplink connection may differ from the network technology selected for the downlink. Preferably, at least two stream parts are used for the uplink and/or downlink and each of the stream parts transmitted in one direction is transmitted over a different network technology.

The schedulers provided in the multiplexing/demultiplexing modules in the mobile entity and the proxy can be configured to determine a chronological order of the data packets of the user data plane stream, when at least two stream parts are transmitted to the entity, the scheduler at the receiving side being further configured to resemble the at least two stream parts in the correct chronological order.

Furthermore, the proxy or mobile entity may be able to determine whether the exchange of the user data plane stream over at least two different network transmission technologies is currently not possible. If this is the case, a suspend message can be transmitted to the multipath control entity which indicates that the transmission over the at least two different network technologies is not possible.

The above-discussed solution has the advantages that it supports existing channel bonding techniques such as MLPPP or MPTCP. The above-described solution is also future proof as it allows integration of future bonding techniques. It furthermore allows operators to manage and control channel bonding based on the various capabilities, the available access technologies and the type of user subscription or the cell load. Furthermore, the invention is transparent to existing client application and internet servers.

The invention claimed is:

1. A mobile entity configured to exchange a user data plane stream with a proxy using at least two different network technologies, wherein the user data plane stream is exchanged between an application in the mobile entity requesting the exchange and an application server connected to the proxy, and wherein the mobile entity comprises:
   input/output circuitry; and
   processing circuitry operatively associated with the input/output circuitry and the processing circuitry configured to:
   receive, via the input/output circuitry, a control message from a multipath control entity, the control message comprising a split decision indicating that the user data plane stream is split into at least two stream parts;
   determine, from the control message, that the user data plane stream is split into the at least two stream parts and determine over which of supported network technologies each of the at least two stream parts is exchanged with the proxy;
   exchange the user data plane stream with the at least two stream parts in accordance with the control message, including preparing uplink transmission of at least one stream part to the proxy using a corresponding network technology indicated in the control message, and preparing downlink reception of at least one stream part using a corresponding network technology indicated in the control message, wherein the corresponding network technology for the uplink transmission of the at least one stream part differs from the corresponding network technology for the downlink reception of the at least one stream part;
   determine whether the exchange of the user data plane stream over the at least two different network technologies is currently not possible at the mobile entity; and
   in response to a determination that the exchange of the user data plane stream over the at least two different network technologies is currently not possible at the mobile entity, generate a suspend message indicating that transmission over the at least two different network technologies is currently not possible.

2. The mobile entity according to claim 1, wherein the processing circuitry is further configured to:
   transmit the suspend message to the multipath control entity.

3. A method for operating a mobile entity in which a user data plane stream is transmitted to a proxy using at least two different network technologies, wherein the user data plane stream requested by an application running on the mobile entity is exchanged between the mobile entity and an application server connected to the proxy, the method comprising:
   receiving a control message from a multipath control entity, the control message comprising a split decision indicating that the user data plane stream is split into at least two stream parts and over which of supported network technologies each of the at least two stream parts is exchanged with the proxy;
   determining, from the control message, how the user data plane stream is split into the at least two stream parts and determining over which of the supported network technologies each of the at least two stream parts is exchanged with the proxy;
   exchanging the user data plane stream with the at least two stream parts in accordance with the control message, including preparing uplink transmission of at least one stream part to the proxy using a corresponding network technology indicated in the control message, and preparing downlink reception of at least one stream part using a corresponding network technology indicated in the control message, wherein the corresponding network technology for the uplink transmission of the at least one stream part differs from the corresponding network technology for the downlink reception of the at least one stream part;
   determining whether the exchange of the user data plane stream over the at least two different network technologies is currently not possible at the mobile entity; and
   in response to determining that the exchange of the user data plane stream over the at least two different network technologies is currently not possible at the mobile entity, generating a suspend message indicating that transmission over the at least two different network technologies is currently not possible.

4. The mobile entity according to claim 1, wherein the processing circuitry is further configured to:
   determine a chronological order of data packets of the user data plane stream that are received from the proxy in two or more stream parts; and
   assemble the received data packets according to the determined chronological order.

* * * * *